US010974980B2

(12) United States Patent
Englram

(10) Patent No.: US 10,974,980 B2
(45) Date of Patent: Apr. 13, 2021

(54) TREATING WATER

(71) Applicant: Absolute Graphic Technologies USA, Inc., Corona, CA (US)

(72) Inventor: Paul Englram, Oak Park, IL (US)

(73) Assignee: Absolute Graphic Technologies USA, Inc., Corona, CA (US)

( * ) Notice: Subject to any disclaimer, the term of this patent is extended or adjusted under 35 U.S.C. 154(b) by 13 days.

(21) Appl. No.: 15/540,298

(22) PCT Filed: Dec. 29, 2015

(86) PCT No.: PCT/US2015/067949
§ 371 (c)(1),
(2) Date: Jun. 28, 2017

(87) PCT Pub. No.: WO2016/109594
PCT Pub. Date: Jul. 7, 2016

(65) Prior Publication Data
US 2018/0002212 A1    Jan. 4, 2018

Related U.S. Application Data

(60) Provisional application No. 62/098,069, filed on Dec. 30, 2014.

(51) Int. Cl.
*C02F 9/00* (2006.01)
*B01D 17/02* (2006.01)
(Continued)

(52) U.S. Cl.
CPC .............. *C02F 9/00* (2013.01); *B01D 15/361* (2013.01); *B01D 17/0205* (2013.01);
(Continued)

(58) Field of Classification Search
None
See application file for complete search history.

(56) References Cited

U.S. PATENT DOCUMENTS 4,753,730 A    6/1988 Maurer
4,983,287 A *  1/1991 Arnold ............... B01D 17/0205
                                                210/259

(Continued)

FOREIGN PATENT DOCUMENTS

WO    WO 2014/088826        6/2014
WO    WO-2014088826 A1 *   6/2014  ............... C02F 9/00
WO    WO-2015021342 A1 *   2/2015  ............... C02F 1/40

OTHER PUBLICATIONS

International Search Report and the Written Opinion of the International Searching Authority for PCT/US2015/067949 dated Apr. 19, 2016, 12 pages.

(Continued)

*Primary Examiner* — Jonathan M Peo
(74) *Attorney, Agent, or Firm* — Fish & Richardson P.C.

(57) ABSTRACT

Systems and methods for treating produced water and/or flowback water from fracking operations include: an oil water separator; a first filter downstream of the oil water separator; and an electrocoagulation unit downstream of the first filter. Systems and methods can be used for producing a concentrated brine for use in industrial applications and a separate stream of fresh water.

22 Claims, 5 Drawing Sheets

(51) Int. Cl.
- *B01D 17/04* (2006.01)
- *B01D 15/36* (2006.01)
- *B01D 61/02* (2006.01)
- *E21B 43/34* (2006.01)
- *C02F 1/24* (2006.01)
- *C02F 1/463* (2006.01)
- *C02F 1/40* (2006.01)
- *C02F 1/42* (2006.01)
- *C02F 1/44* (2006.01)
- *C02F 1/74* (2006.01)
- *C02F 1/00* (2006.01)
- *C02F 103/10* (2006.01)
- *E21B 43/26* (2006.01)

(52) U.S. Cl.
CPC ....... *B01D 17/0214* (2013.01); *B01D 17/045* (2013.01); *B01D 61/025* (2013.01); *E21B 43/34* (2013.01); *C02F 1/004* (2013.01); *C02F 1/24* (2013.01); *C02F 1/40* (2013.01); *C02F 1/42* (2013.01); *C02F 1/441* (2013.01); *C02F 1/463* (2013.01); *C02F 1/74* (2013.01); *C02F 2103/10* (2013.01); *E21B 43/26* (2013.01)

(56) References Cited

U.S. PATENT DOCUMENTS

| | | | |
|---|---|---|---|
| 5,611,907 A * | 3/1997 | Herbst | C02F 1/46104 204/237 |
| 6,337,023 B1 * | 1/2002 | Broussard, Sr. | C02F 1/24 210/703 |
| 7,258,800 B1 | 8/2007 | Herbst | |
| 2010/0038310 A1 * | 2/2010 | Shafer | C02F 9/00 210/605 |
| 2010/0307975 A1 | 12/2010 | Johnson | |
| 2011/0266203 A1 * | 11/2011 | Frisky | C02F 9/00 210/205 |
| 2013/0026082 A1 * | 1/2013 | Al-Shafei | B01D 17/06 210/96.1 |
| 2013/0168323 A1 * | 7/2013 | Soane | B01D 17/0202 210/691 |
| 2013/0313199 A1 | 11/2013 | Marcin | |
| 2014/0158550 A1 | 6/2014 | Seth et al. | |

OTHER PUBLICATIONS

European Patent Office, Extended European Search Report for EP Appl. No. 15876207.0, dated Jul. 23, 2018, 12 pages.

European Patent Office, Partial Supplementary European Search Report for EP Appl. No. 15876207.0, dated Apr. 19, 2018, 16 pages.

European Patent Office, Communication pursuant to Article 94(3) EPC issued in related EP Application No. 15876207.0 dated Mar. 25, 2020, 5 pages.

Intellectual Property India, Examination Report under section 12 & 13 of the Patents Act issued IN related in Application No. 201737021982 dated Jan. 6, 2020, 8 pages.

Intellectual Property of Australia, Examination Report issued in related AU Application No. 2015374153 dated Apr. 9, 2020, 3 pages.

* cited by examiner

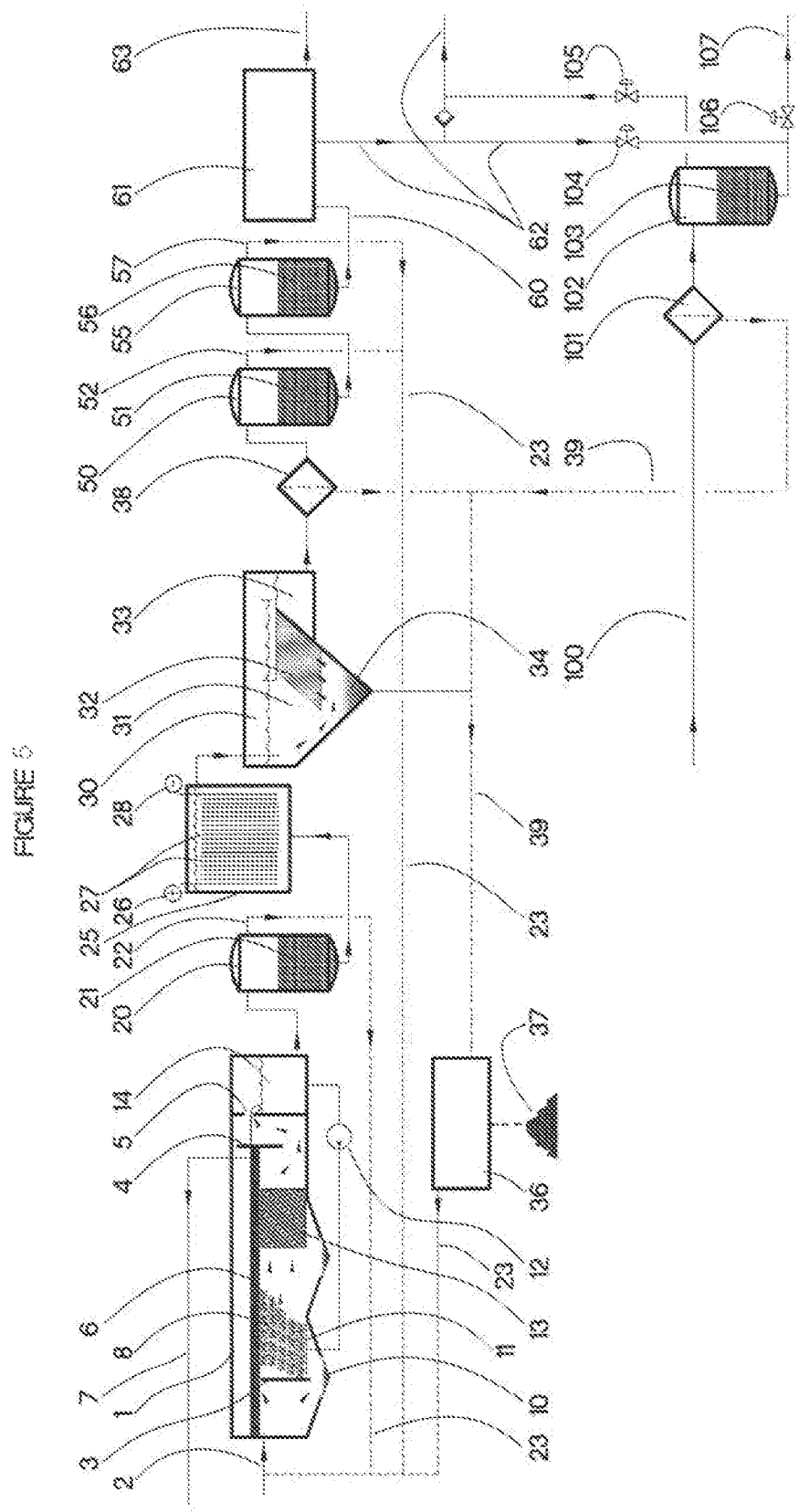

TREATING WATER

PRIORITY CLAIM

This application is a national stage application under 35 U.S.C. § 371 of PCT Application No. PCT/US2015/067949 entitled "Treating Water", filed Dec. 29, 2015; which claims priority to U.S. Provisional Patent Application No. 62/098,069 entitled "Treating Water," filed Dec. 30, 2014, the entire contents of which are hereby incorporated by reference.

BACKGROUND

This description relates to treating water such as, for example, water produced during the production of oil and gas.

Water and wastewater treatment systems may include removal of oil, flocculation, clarification and filtration. For example, systems have been developed to remove contaminants and boron from water produced during the production of oil and gas or flowback water from fracking operations. Systems have also been developed to treat sea water to remove salts and minerals.

SUMMARY

This document describes systems and methods to treat water such as, for example, water produced during the production of oil and gas ("produced water") and flowback water from fracking operations. These systems and methods cost effectively remove the contaminants present, for example, in produced water to provide fresh water that can be used by the agricultural market and a concentrated brine solution, which can be used by the oil and gas industry for fracking and or well stabilization. These systems and methods can generate fresh water with very low levels of boron and low levels of total dissolved solids ("TDS"). For most reuse applications, combined calcium and magnesium should be below 80 ppm and boron should be below 10 ppm.

These systems and methods are more capable of cost effectively and efficiently treating the specific components found in produced water and providing reusable materials from its flow streams than conventional wastewater treatment systems for municipal and industrial wastewater that include removal of oil, flocculation, clarification and filtration process steps. The components of these systems are arranged to provide a sequence of treatment stages that removes contaminants in an order which provides high efficiency for each treatment stage and also efficiently reprocesses rejected fluids from these stages to increase the reuse of the fluids and reduce waste materials which require disposal. The resulting systems operate in a cost effective manner with the design providing for an energy efficient process, requiring less care and maintenance than many other systems.

The water that flows out of the ground from an oil and gas well, during production, contains between 3 to 15 parts water to crude oil. This mixed fluid is passes through an oil/water separation phase at the well head, to direct the oil to be sold. This remaining produced water is separated and, currently, treated as waste to be disposed of. This produced water contains a relatively small percentage of oil. This remaining crude oil has a tendency to adhere to small particulate or sediment in the water from extraction and is suspended oil. These systems and methods use enhanced oil separation technology to remove 95-98% of this petroleum material from produced water to recover the value associated with this petroleum and to prevent the petroleum from fouling the other treatment phases of the systems.

Some embodiments of these systems include a specific gravity separation section, a dissolved air flotation section, a low velocity coalescing section and an oleophilic media section. Some of the larger petroleum materials rise to the surface in the specific gravity section. This forms a layer of petroleum on the fluid surface which enhances the agglomeration of smaller particles in the second and third stage of the separation. The dissolved air floatation section imparts small microbubbles into the liquid, which attach to the small suspended oil particles and combination oil-solid particles remaining in the water column and gently lifts then to the surface, where they become attached to the existing oil floating on the surface. No plates or other suspended items should be in the path of the microbubbles which gently lift the suspended oils to the surface. As this is not refined oil, but crude oil present in the produced water, plates or other suspended surfaces in the fluid path at this point would become clogged, as the crude oil has a high tack level and will stick to these surfaces, clogging and blocking the flow path. The small microbubbles also carry oxygen into the liquid, which is important to a subsequent electro-coagulation (EC) phase. These systems are more effective than technologies use carbon dioxide as a dissolved gas because use of carbon dioxide or other such gasses would decrease the pH of the fluid and also not add the oxygen, which is beneficial to the EC performance.

These systems and methods can be implemented without adding chemicals at this point in the process. Applying primarily or solely mechanical techniques at this stage reduces the cost of operation and lowers the amount of solids generated which have to be removed from the process.

As the microbubbles are infused into the produced water, natural occurring surfactants in the produced water may cause foaming on the oil layer. To remove such foam, an ultrasonic generator creates a high intensity ultrasonic waves which efficiently break the foam bubbles without contaminating the petroleum. These systems allow the free oils from the specific gravity section to form a layer on the surface in the first section of the system. The petroleum layer at the surface provides a place for the smaller suspended oil particle lifted out in the dissolved air section to adhere and agglomerate. This will keep these small suspended oil particles at the surface for removal. Including the specific gravity separation section, the dissolved air flotation section, and the low velocity coalescing section in the same vessel allows the benefits of their combined operation to perform together and can provide better treatment than systems with these sections in different vessels. Level controls maintain an appropriate level of this petroleum layer during operation.

The dissolved air flotation section is provided prior to the coalescing phase as the coalescing phase can be easily clogged with the small particles which the oil droplets are attached to. The flow which passes from the dissolved air floatation section into the coalescing section is relatively free of petroleum particles attached to solids which, due to their size, are lifted out in the dissolved air floatation phase. Any remaining microparticles are then combined and lifted to the surface in the coalescing phase. This coalescing phase can operate relatively maintenance free. Without the dissolved air flotation section, the coalescing section becomes laden with solids and requires constant maintenance to remove the combination petroleum droplets and solid particles which have been stuck to the coalescing materials, which turns the material into a non-usable sludge and results in the loss of the value of the petroleum that is recovered in reusable form in our system.

The water is then pumped through an optional oil-collecting, regenerative media filter which contains a type of oleophilic media, such as walnut shell particles, plastic beads or others. This removes the remaining oil particles and solids down to 10-15 micron particles. The media is regenerated by a turbulent backwash cycle and the backwash fluid is passed back to the inlet of the enhanced oil water separation system for re-use. This phase is performed with a filter. Because most of the oil content has been removed, the filter usually does not foul from the oil particles and delivers water to the EC in which any remaining particles, below 10-15 micron, will stay in suspension as they pass through the EC.

These initial treatment phases provide substantially particle-free and petroleum oil-free materials to the EC unit. The EC unit includes a chamber in which the water will pass through a series of metal plates, rods or cylinders. Certain of these metal plates are positively and others are negatively charged to create a current path through the liquid and to the non-charged plates. The electrical current reacts with the molecular structure of the contaminants in the water, creating oxides of the various metal compounds such as, for example, boron and disassociates hydrocarbons and other organic materials. A non-chemically generated flocculation is formed in the water which passes from the EC. The high solution conductivity of this fluid helps to efficiently carry the current to the contaminant molecules. The lower the petroleum content in this fluid, the more efficiently the EC process performs. Petroleum also is broken down in this process. Thus, the less petroleum is in this fluid, the greater the portion of the electrical charge that is applied to oxidizing and removing metals such as, for example, boron and other compounds. Thus, the enhanced oil water separation process discussed above can also improve operation of the EC unit. In addition, the dissolved air flotation phase of the enhanced oil water separation process not only performs the mechanical lifting and removal of the petroleum but also increases the oxygen content in the fluid to increase the metals and boron removal rate by the oxidation process performed in the EC.

The effluent from the EC flows into a clarifier to allow the solids to separate to the bottom, where they can be drawn off and efficiently removed by conventional filtration, typically a filter press. An angle plate clarifier is often best for this process to reduce the amount of time and volume of the containers, which this effluent requires for separation.

The clarified liquid from the clarifier will be pumped to a mechanical filter such as, for example, a media filter or an ultrafiltration ("UF") system. The majority of the particles in the clarified liquid are 10 microns in size, so filtration at or below this level is required.

The substantially solid free solution is pumped through a selective ion exchange system. This system can target calcium, magnesium, and boron. The calcium and magnesium levels are lowered to lower the scaling potential of the water as measured by, for example, the Langelier Saturation Index (LSI) to enhance the reverse osmosis (RO) system operation and provide an RO concentrate with lower concentration of calcium and magnesium in the concentrate water. The re-use of the concentrate solution may require certain levels of calcium and magnesium, which will be determined by the re-use of this concentrate. The boron is lowered to a level to provide a RO permeate and concentrate with lower concentration of boron in both of these water streams to meet the requirements of RO permeate discharge or re-use and the re-use of the RO concentrate. The RO permeate stream would be typically be below 2 ppm and the RO concentrate would typically be below 15 ppm, depending upon its use. If the selective ion exchange system is placed after the RO system, the RO concentrate is left with high concentration of boron, rendering this solution unusable by the oil and gas industry. The target is to have reusable low TDS, fresh water for the agricultural market and generate a clean brine water that can be used by the oil and gas market, obtaining maximum value from the materials in the water.

The oil and gas market needs water for fracking applications. Water used for fracking typically requires the addition of sodium chloride salt to reach the salt content of the existing water in the well, where it is injected. The systems and methods described in this application provides the clean brine water required for fracking applications rather than consuming the local fresh water supply, in competition with the agricultural market, and requiring salt be added to the water prior to fracking. The naturally occurring salt in the produced water is concentrated by the RO system. By using selective ion exchange to remove the calcium magnesium and boron, this process also provides the water needed for fracking applications without including components which inhibit the fracking chemicals. For example, boron reacts with the gel that is used in fracking applications and begins an undesirable reaction before the fracking fluid reaches its point of action. Calcium and magnesium also have adverse effects on the fracking fluids or fluid used in well balancing.

By providing RO concentrate that can be used for fracking applications, these systems and methods provide reduced overall operation costs by replacing the cost of disposing concentrate (e.g., the cost of transporting concentrate to and disposing concentrate down a deep well) from treating produced water with a revenue stream. This can be particularly significant relative to downhole disposal in injection wells, a current technology for disposing of unwanted liquids in which liquid is forced into a dry well cavity, typically 3000-7000 feet below ground, under high pressure. If high concentrations of boron or other metals are present in the fluid, this approach requires a deeper, more secure injection well. This increases the cost of disposal at an injection well and makes the removal of the boron and other metals from the RO concentrate even more important.

Some systems for treating produced water and/or flowback water from fracking operations include: an oil water separator; a first filter downstream of the oil water separator; and an electrocoagulation unit downstream of the first filter. Some systems include one or more of the following features.

In some embodiments, the oil water separator comprises a housing, a specific gravity section, a gas flotation system downstream of the specific gravity section, and the coalescing media pack downstream of the gas flotation system, wherein the specific gravity section, the gas flotation system, and the coalescing media pack are disposed within the housing. In some cases, the gas flotation system includes a source of an oxygenated gas and a distribution element configured to impart the oxygenated gas into water being treated in the form of microbubbles. In some cases, the oxygenated gas comprises air. The microbubbles can have a characteristics size of between 5 and 50 microns.

In some embodiments, the first filter includes an oleophilic media.

In some embodiments, the system includes a clarifier downstream of the electrocoagulation unit. In some cases, the system includes a reverse osmosis system downstream of the clarifier. In some cases, the system includes a second filter downstream of the clarifier and upstream of the reverse osmosis system. In some cases, the system includes an ion exchange system downstream of the clarifier and upstream of the reverse osmosis system. In some cases, the system includes a solids separation/concentration device disposed to receive solids from the clarifier. In some cases, the system includes piping providing a channel between an outlet of the solids separation/concentration device and an inlet of the oil water separator.

Some methods of treating produced water and/or flowback water from fracking operations include: separating oil from water being treated by using differences of specific gravity and then adding microbubbles of gas to the water being treated to lift material in the water being treated; applying electrocoagulation to the water being treated after separating oil from the water being treated; removing dissolved solids from the water being treated using ion exchange; and then removing dissolved salts from the water being treated using reverse osmosis.

Some methods of producing a concentrated brine for use in industrial applications include: introducing produced water into an oil water separator; increasing oxygen levels in water being treated in the oil water separator; applying electrocoagulation to the water discharged from the oil water separator; concentrating dissolved salts in the water being treated using reverse osmosis to produce the concentrated brine; and collecting the concentrated brine for use in industrial applications.

Methods can include one or more of the following features.

In some embodiments, adding microbubbles of gas to the water being treated increases oxygen levels in the water being treated.

In some embodiments, the ion exchange preferentially removes calcium, magnesium, and/or boron.

In some embodiments, applying electrocoagulation to the water being treated creates oxides of at least some metals present in the water being treated and disassociates hydrocarbons and other organic materials.

In some embodiments, increasing oxygen levels in water being treated includes adding microbubbles of dissolved air to the water being treated. In some cases, methods include removing dissolved solids from the water being treated using ion exchange before concentrating dissolved salts in the water being treated using reverse osmosis. In some cases, removing dissolved solids from the water being treated using ion exchange includes preferentially removing calcium and magnesium by ion exchange and then preferentially removing boron by ion exchange. In some cases, applying electrocoagulation to the water being treated creates oxides of boron present in the water being treated and disassociates hydrocarbons and other organic materials. In some cases, applying electrocoagulation to the water being treated creates oxides of metals other than boron present in the water being treated.

The described systems and methods provide a staged process which is cost effective, which resists fouling, and which is repeatable day after day to remove, for example, the various contaminants typically present in produced water. These contaminants include petroleum materials, other organic materials, metals and salts. These systems and methods are implemented using stages which increase the efficiency of the next stage, while providing reusable products from the process. The described systems and methods can include enhanced oil water separation, including regenerative media filtration, EC, clarification, filtration, selective ion exchange, and/or RO.

The described systems and methods provide a staged process which can treat, for example, contaminated produced water from the oil and gas industry. This approach cost effectively removes the contaminates present in produced water, including boron, and provides water that can be used by the agricultural market and a concentrated brine solution, which can be used by the oil and gas industry for fracking and or well stabilization. This process includes efficient, cost effective steps to systematically remove the oils, TDS, specialty materials, such as boron and provide re-usable materials from the steams.

Boron is a material which creates problems for environment, plant life, drinking water sources and has problematic chemical reactivity with the chemistry of fracking fluids. The WHO typically establish the boron limit for drinking water at <1 PPM. Typical produced water supplies have in the low ranges, 20-25 PPM and in the higher ranges over 100 PPM. Boron is a material that is not removed as easily as other soluble metals by typical treatment methods. Typical electrocoagulation methods have very high removal rates for metals (85-98% removal), but much lower for boron (25-40% removal). RO membranes remove and concentrate salts and metals at a high rate (typically 95-98%) but have lower removal rates for boron (typically 70-85%). In order to take the high concentration of boron in the produced water down to usable levels, a unique arrangement of components are required. Using enhanced electrocoagulation, selective ion exchange, and enhanced RO provides a system which removes these materials in efficient steps, allowing reusable materials to be generated from the output steams.

The details of one or more embodiments of the systems and methods are set forth in the accompanying drawings and the description below. Other features, objects, and advantages of the systems and methods will be apparent from the description and drawings, and from the claims.

DESCRIPTION OF DRAWINGS

FIG. 5 is a flow schematic of a water treatment system.

Like reference symbols in the various drawings indicate like elements.

DETAILED DESCRIPTION

FIGS. 1-4 illustrate an exemplary water treatment system which has components which work together to treat water such as, for example, produced water in stage with each stage increasing the efficiency of the next stage, while providing reusable products as treatment by-products.

Figure 1:
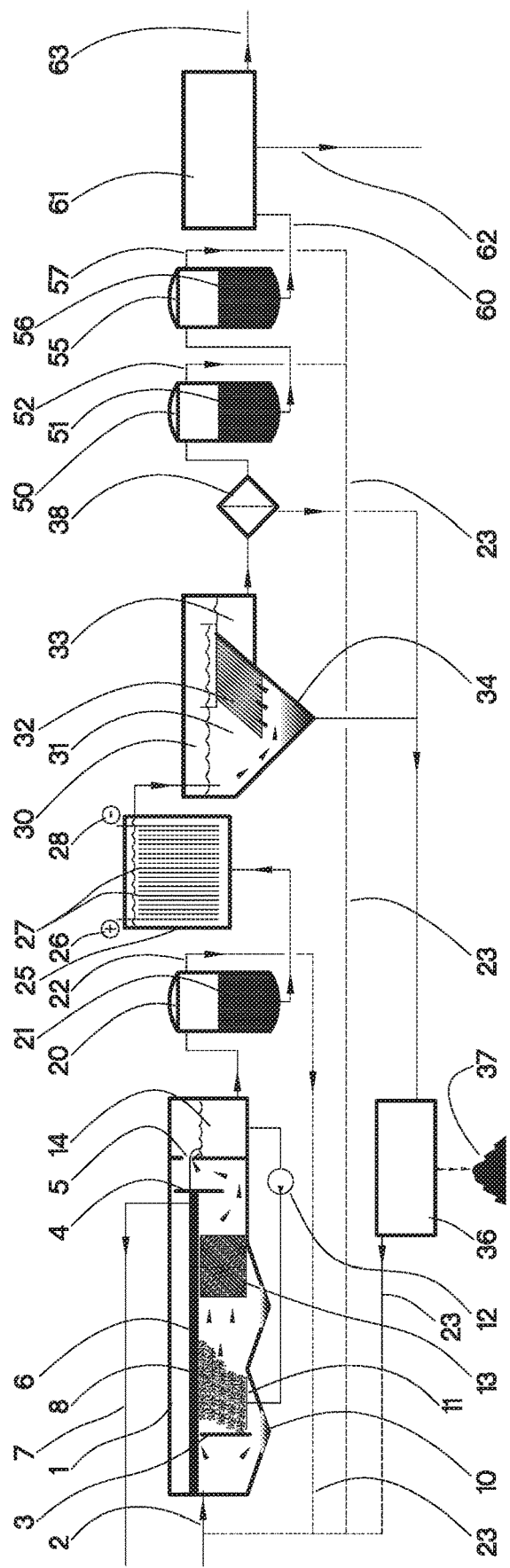
FIG. 1 is a flow schematic of a water treatment system.

FIG. 1 shows flow through the water treatment system. Water being treated flows into the inlet of an enhanced oil water separator 1 through an input connection (e.g., port 2). The first section of the oil water separator 1 is a specific gravity separation section that allows free oils separate and move to the surface. Water flows above or below baffle plate 3 with solids falling to the bottom and oils being driven to the surface. The water flows slowly into the dissolved air flotation section, where small microbubbles 8 are pumped into the water through distribution bar 11. The microbubbles attach to the very small oil droplets and suspend oil which may be adhered to small solid particles. These materials (e.g., combined microbubble, solid microparticle, and attached oil) rise to the surface and combine with oil 6 present on the surface. The water then flows to a coalescing media pack 13 where remaining small oil droplets are collected with other droplets to a point where they are large enough to float to the surface and join with the oil 6 present on the surface. The term oil is used to indicate oils and other petroleum products. The water flows under baffle plate 4, which retains oil layer, but allows the water to flow under. The water reaches the level control weir plate 5, where it spills over into the reservoir 14.

This water in reservoir 14 is a source for the fluid used to generate the dissolved air and supplies the downstream components. Water is pumped from the reservoir 14 to a filter 20 (e.g., an oleophilic media filter). Water flows through media 21 in the media filter 20 to the underside of an EC unit 25. When the media 21 becomes loaded with oil and solid particles, a backwash cycle is performed with backwash fluid being recycled to the inlet of the oil water separator via line 22.

Water supplied to the EC unit 25 typically enters the bottom and flows upward. The illustrated EC unit 25 applies DC current to the positively charge plate(s) 26 and negatively charged plate(s) 28. The conductive nature of the water allows the current to pass through the non-charged plates 27, which receive their current from the fluid. As the fluid flows upward through the gaps between the plates, an oxidizing, colloid-forming, off-gassing reaction begins to take place. The treated water flows out of the top of the vessel and gravity flows into a clarifier 30. Gases such as hydrogen, oxygen, carbon dioxide etc. are expelled during the EC treatment and off-gas at the surface of the water, at the top of the EC chamber. The EC technology is well developed and a variety of commercial designs can be used for the EC unit 25.

As the water flows into the clarifier 30, it reaches settling chamber 31, which allows the solids to agglomerate and separate from the liquid. The solids fall to the bottom of the chamber 31 and the clarifying liquid travels up plates 32 (e.g., lamella style plates), which accelerate the separation from the solids. Some systems include multiple settling chambers. The solids at the collection point 34 are pumped to a filter press 36.

The filter press 36 compresses the solids 37 for collection with removed water being recycled through pipe 23 to the inlet of the enhanced oil water separator 1 at port 2 for re-oxygenation and treatment. The water continues through an overflow weir and into a clarified liquid section 33. The clarified liquid is pumped through a filter 38 (e.g., a particle filter) to remove remaining small particles. The filter 38 may require a backwash, in which this high solids material is ported to the filter press 36 to collect the solids 37 and return the water through pipe 23 to the inlet of the enhanced oil water separator 1 at port 2 for re-oxygenation and treatment.

Water leaving the filter 38 is pumped through selective ion exchange resin systems to remove dissolved solids which are not desirable in RO discharge streams (i.e., the RO concentrate 62 or the clean water 63). The water is initially pumped through selective ion exchange system 50 to remove calcium and magnesium and, then, into the selective ion exchange system 55 to remove boron from the water prior to reaching the inlet to the RO unit 61. The selective ion exchange systems 50 and 55 monitor their discharge and activate regeneration based upon the loading of the resin 51 and the resin 56, respectively. As the resin becomes exhausted, a regeneration process begins with backwash liquid discharged through ports 52 and 57. A substantial portion of this liquid is sent back to the beginning of the process through pipe 23 for regeneration and reuse.

Water leaving the selective ion exchange process through pipe 60 has low levels and/or be free of calcium, magnesium, boron and/or other selected problematic ions. The membrane filter of the RO unit 61 concentrates the remaining dissolved salts (e.g., primarily sodium chloride). These salts stay on the concentrate side of the membrane and increase in concentration as clean water 63 is forced through the membrane under pressure. This RO concentrate 62 is transported to the oil and gas industry to be used as fracking water and for well balancing. This water already contains the sodium chloride that would need to be added if fresh water were being used as the basis for fracking water and does not contain boron or other products which create problems in fracking fluids. The clean water 63 flow from the outlet pipe is low in TDS, contains no petroleum materials and is suitable for reuse in agriculture or other applications.

In applications where the water is used directly in the oil and gas market and does not require RO treatment or in applications where the sodium chloride concentration are too high to pass through an RO system effectively, the pipe 60 would not flow to an RO unit, but to a storage tank where it would be held for re-use.

Figure 2:
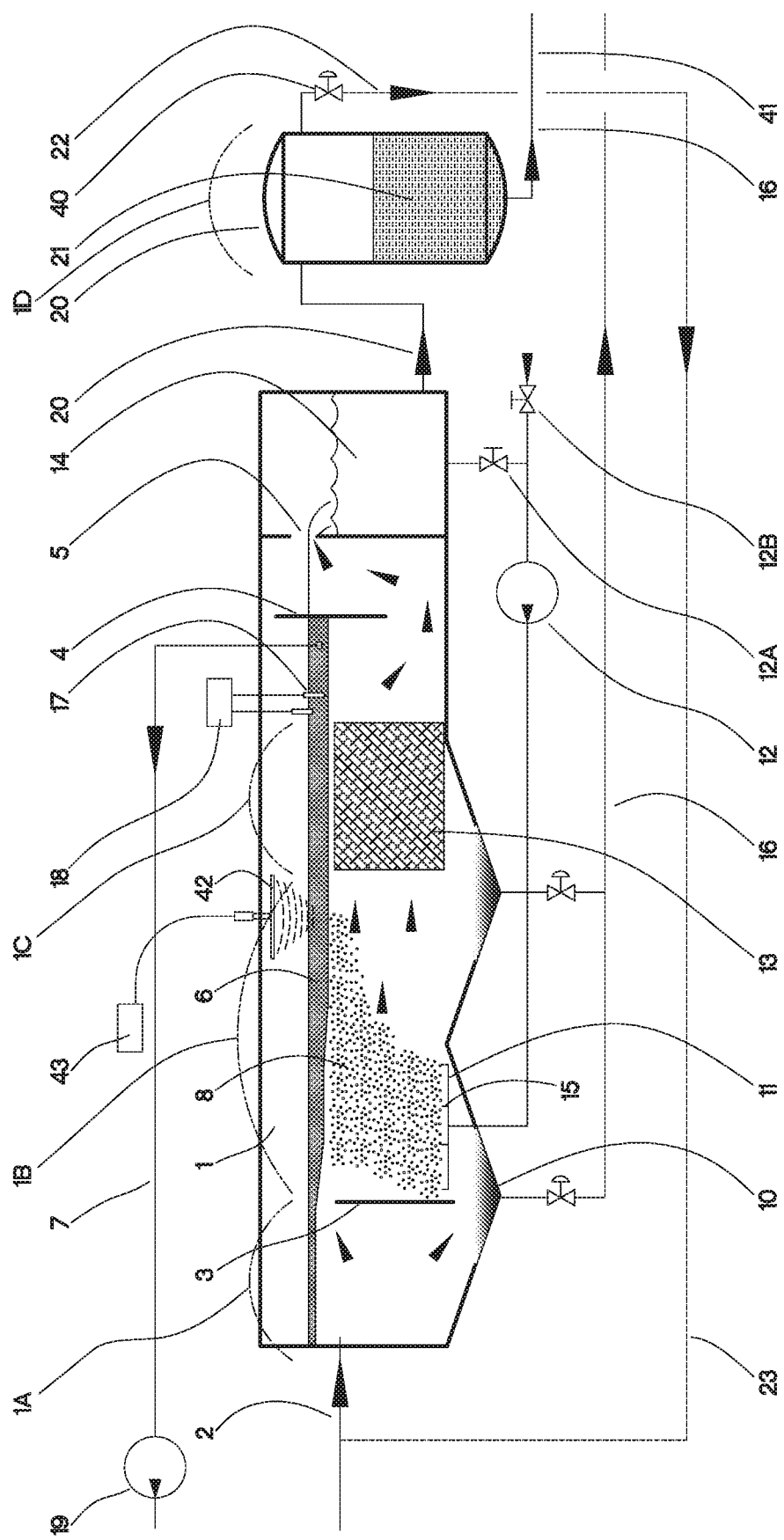
FIG. 2 is a cross-sectional schematic of a portion of the water treatment system of FIG. 1.

FIG. 2 illustrates the enhanced oil water separator 1. A specific gravity separation section 1A of the oil water separator 1 operates due to the difference in specific gravity between components of water being treated. A dissolved air floatation section 1B pumps small microbubbles into the water after baffle plate 3. As discussed above, these microbubbles gently and very slowly rise to the surface, while attaching to the suspended oil particles, lifting them to the surface. In a coalescing section 1C, the water passes through coalescing material such as, for example, oleophilic plastic or stainless steel, which get gets in the path of the small remaining oil droplets such that the oil droplets cling and join together with other droplets to then float to the surface. An oil collecting regenerative media filter 1D contains a type of oleophilic media and filters this fluid down to 10-15 micron particle size. Valve 40 is normally closed during system operation. When the media filter 20 becomes loaded and needs to be regenerated, the media is backwashed with turbulent flow to fluidize the bed, freeing the oil and particles from the media surface. Valve 40 will then open and allow the flow of this released oil and particles to be forced through pipe 23 back to the inlet of the enhanced oil water separator 1, where the oil will agglomerate with large oil particles present in the inlet and float to the surface.

The increase in the dissolved oxygen added by the dissolved air floatation process helps to drive off $CO_2$ and increase the pH of the water. The elevated pH and the presence of added oxygen assists the oxidation of metals in the EC unit 25. This is done without adding chemicals. The specific gravity separation section 1A is effective on larger oil droplets, which can physically float to the surface. This is a small percentage of the petroleum oil present in produced water. Placing the dissolved air floatation section 1B after the specific gravity separation section 1A and before the coalescing section 1C allows free oils from the specific gravity separation section 1A to layer on the water surface in the first section of the system. The petroleum layer at the surface provides a place for the smaller suspended oil particle lifted out in the dissolved air section to adhere and agglomerate which keeps them at the surface for removal.

The water flowing from pipe 16, has 95-98% of this petroleum material removed and is filtered down to 10-15 micron, which improves effectiveness of the EC unit 25, which is the next stage of the process. Lowering the concentration of oil left at this point lowers the power required to operate the EC efficiently and the volume of solids generated by the EC unit 25. This translates into lower volumes of solids to haul and dispose of, thus further reducing the cost of operation. Placing the various stages of the oil/water separation and oxidation prior to the EC can provide highly efficient system operation.

Pump 12 is used to generate the microbubbles. Valve 12A is restricted to create a vacuum on the suction of pump 12 and valve 12B is a metering type valve which allows a relatively small amount of air to enter the pump suction with the water. As the mixture reaches the pump discharge, the change from vacuum to pressure breaks the air into many small microbubbles which travel out the discharge pipe to the distribution bar 11 and out the multiple ports in the bar 15. As the microbubbles are infused into the produced water, natural occurring surfactants in the produced water may cause some foaming on the layer of oil 6. An ultrasonic generator 42 powered by ultrasonic control 43, creates high intensity ultrasonic waves, which are targeted at the liquid surface and efficiently break the foam bubbles without contaminating the petroleum.

A series of spray nozzles can spray a water to knock down the buildup of foam, but this technique can add unwanted water to the petroleum layer. If the majority of the suspended oils are not removed in the dissolved air floatation section 1B, the coalescing section 1C will be overloaded with sludge. This sludge will need to be removed via a maintenance function, increasing operating costs and reducing or eliminating the value of the oil captured in this process.

Pipe 7 draws the oil off the top of the surface. The suction for this pipe is activated by sensors 17 (e.g., conductive or capacitive sensors) which are able to sense the difference between water and oil. These sensors 17 are connected to control box 18, which send the signal to the suction pump 19, which transfers this petroleum material to a storage tank when petroleum material is present.

FIG. 2 also illustrates the collection of sediment in the cone sections 10 and connection to pipe 16, which transfers this material to the filter press 36. Some systems use another solids separation/concentration device (e.g., a centrifuge, a roll filter, a belt filter, or a sludge vac concentration tower) rather than a filter press.

Figure 3:
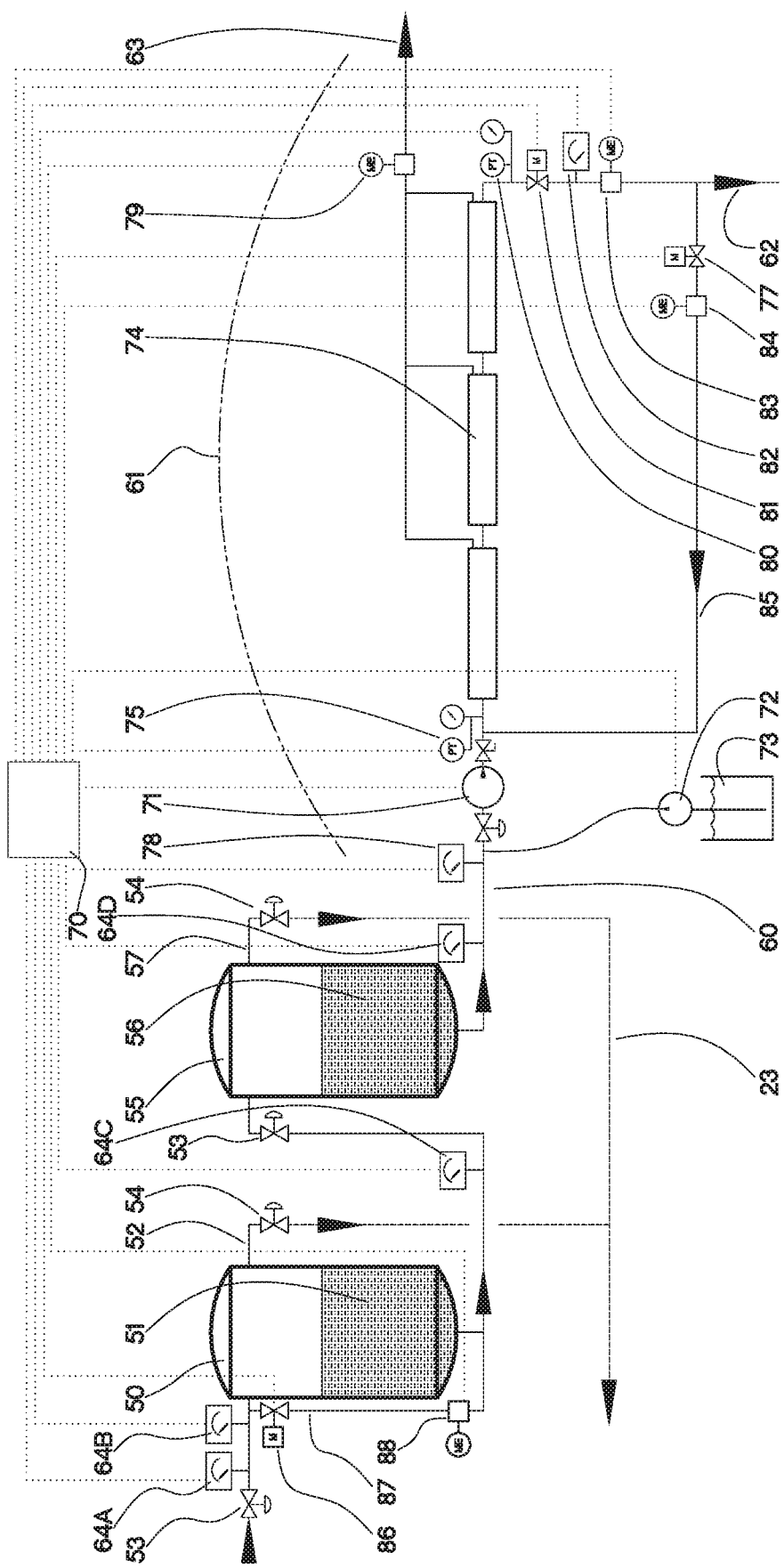
FIG. 3 illustrates a control system which changes system operating parameters in response to variation in TDS levels in feed water for the RO system of the water treatment system of FIG. 1

FIG. 3 shows the RO system and controls which adjust performance of the RO System with the variation in feed water TDS. As produced water varies in its concentration of metals, salts, hardness and other substances, the RO system needs special controls to provide efficient operation and to prevent fouling of the membranes as these substances increase or decrease in concentration. This is different from seawater desalinization and other water treatment application where the feed water is more consistent. The RO system needs flexibility to adjust pressure and concentration of salts and scaling materials in order to increase the production of clean water. Automated valves 53 are disposed in the feed pipe to the selective ion exchange system 50 for calcium and magnesium and to the selective ion exchange system 51 for boron. Valve 54 is installed in the backwash lines 52 and 57 to open and allow flow to drain, reuse, or recycling during a backwash process. Inline sensors 64A (for hardness) and 64B (for boron) are disposed in the feed line. Some systems include additional sensors such as, for example, sensors for barium, strontium, magnesium hydroxide and/or other materials which may need to be monitored because they are scale forming or create downstream limitations in the RO permeate or concentrate use. Motorized valve 86 is disposed in bypass line 87 and flow through this line is measured by flow meter 88. As flow through the bypass is controlled by the position of valve 86, it creates a ratio between this bypass flow and the total flow as measured by the combined flow of permeate flow meter 79 and concentrate flow meter 84. As flow passes through the bypass and joins the flow which is flowing through the selective resin 51, it flows through the pipe into a selective ion exchange system 55 for boron removal and is read by inline sensor 64C, which reads the outbound hardness. The flow passes through the resin 56 for boron removal, it is measured by inline sensor 64D. The flow continues through pipe 60 to the inline sensor 78, to measure PH. When RO feed pump 71 is running, anti-scale pump 72 receives a proportional signal to run at a certain rate to deliver anti-scale solution 73 at a value determined by the control system 70. The RO feed pump 71 receives a signal to a VFD 71A to run at a speed determined by control system 70 from inputs from flow meters 79 and 83 and pressure transducers 75 and 80 and based on the calculation the control system makes from inputs from inline sensors 64C and 78. The discharge flow from RO feed pump 71 flows into the RO housings 74 which are arranged in various configurations to meet the certain RO design conditions. The clean water or permeate flow flows through a pipe to a storage tank for sale and use.

The concentrate or brine water flows through the motorized valve 81 and meter 83 and onto a storage tank for sale and use. If system conditions require, motorized valve 77 is controlled to allow a certain flow to bypass and return to the pump inlet as measured by flow meter 84. Motorized valves 81 and 77 open to a position that maintain a balanced flow through the system, based upon inputs from the control system.

Figure 4:
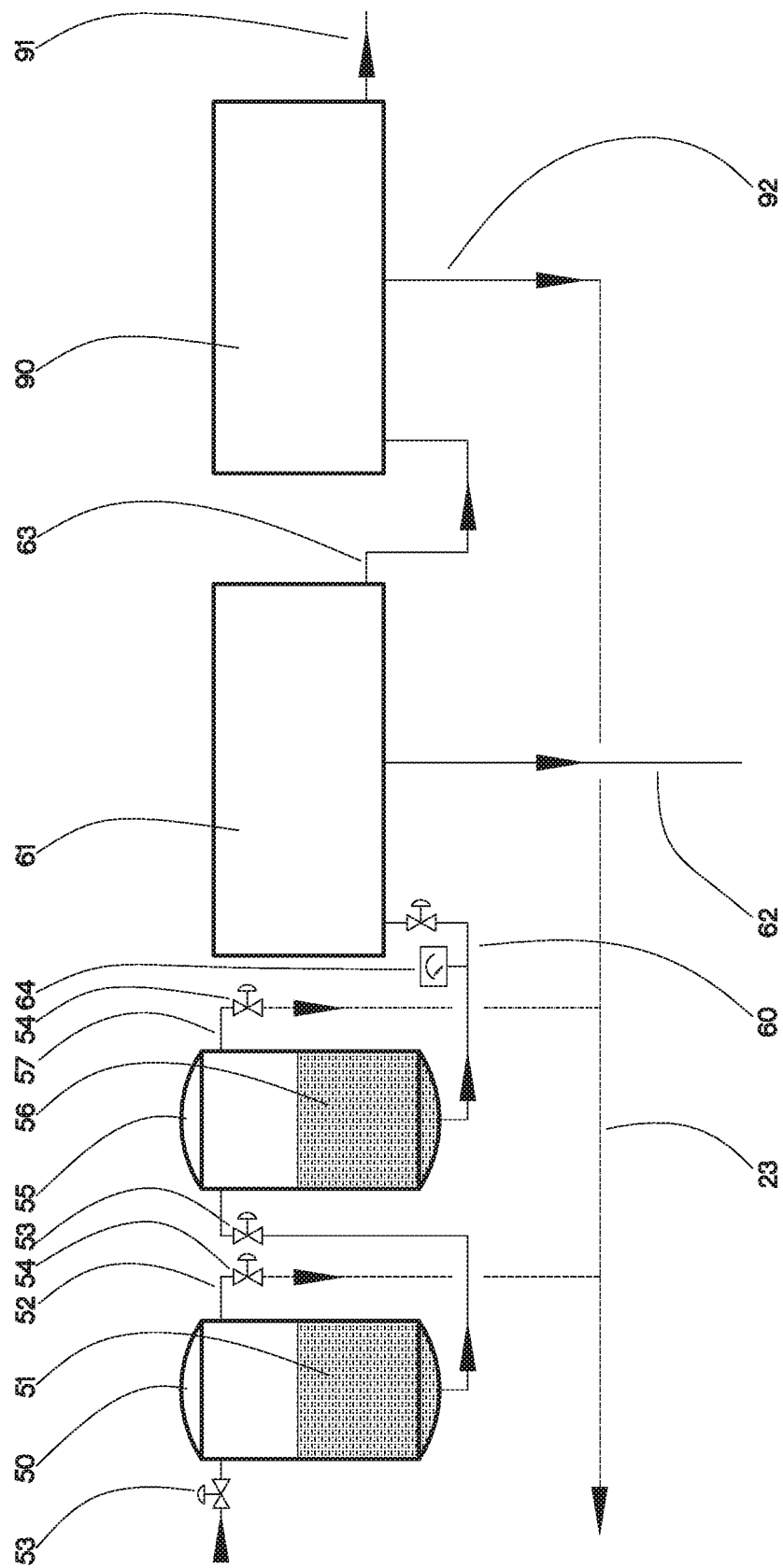
FIG. 4 illustrates the ion exchange and RO units of a water treatment system.

FIG. 4 illustrates a $1^{st}$ stage RO unit 61 and a $2^{nd}$ stage RO unit 90. The valves 53 are used to isolate the vessels during the regeneration process. The valves 54 are installed in the backwash lines 52 and 57 to open and allow flow to drain, reuse or recycling during a backwash process. A sensor or sensors 64 measure the hardness and boron in the water supply inline on the inlet to the $1^{st}$ stage RO unit 61. The RO concentrate 62 flowing out of $1^{st}$ stage RO unit can be sold, for example, for use in fracking applications. The permeate or clean water 63 flowing out of the 1st stage RO unit into the inlet of 2nd stage RO unit. The concentrate 92 flowing out of 2nd stage RO unit flows back to the inlet of the enhanced oil water separation system in pipe 23. The materials in the concentrate 92 are lower than the concentration of these materials in the incoming produced water and are effectively removed as they flow back through pipe 23, to be re-oxygenated in the enhanced oil water separation phase and further reduced in the EC process. Therefore, none of this concentrate flow from the 2nd stage RO unit is lost by the recycling process. The permeate or clean water 91 flows out of the 2nd stage RO unit, which is sold to the agricultural market or other applications and is substantially reduced in TDS and is very clean.

Table 1 and Table 2 show the inputs to the control system 70 and corresponding outputs to the system devices, shown as Item #. The values shown in these charts, at the top of each section, with prefix F5A, F5B, F5C, etc., represent the variation in fluid which is brought to a system, which treats water from multiple well sites, which is commonly required. The Values to System Controls are the Inputs and Outputs from the control system 70. These values correspond to sensors and control components in the RO system and are listed in the table as an Item # and are shown on the FIG. 3 drawing. The Items are listed as and Input to the control system or an Output, which is controlled by the control system. The right hand columns show the resultant change to the output values from the control system, in response to the variations in the input values, due to changing water supplies.

TABLE 1

| F5A -TYPICAL 12,000 PPM AND NOMINAL HARDNESS | | | | | | | |
|---|---|---|---|---|---|---|---|
| VALUES TO SYSTEM CONTROLS ITEM #70 | ITEM # | INPUT | OUTPUT | | | Lower Osmonic Pressure and more Permeate Flow Typical Hardness and PH in ratio to Feed TDS | |
| FEED TDS | 64A | X | | IF | < | 12000 | TDS |
| CONENTRATE TDS | 82 | X | | IF | < | 61000 | TDS |
| FEED PRESSURE | 75 | X | | IF | < | 800 | PSI |
| FEED PUMP SPEED | 71 | | X | THEN | | 65 | 0-100 SCALE |
| FEED SATURATION INDEX (SI) - HARDNESS AND PH | 64C, 78? | X | | IF | < | 1.5 | LSI |
| START IX HARDNESS | 64C | X | | IF | < | 160 | PPM |
| START IX HARDNESS BYPASS VALVE | 86 | | X | THEN | OPEN | 7 | 0-10 SCALE |
| HARDNESS BYPASS FLOW (HBPF) RATIO OF TOTAL FLOW | 88 | X | | THEN | VALUE | .7(PF + CF) | GPM |
| FLOW METERS RATIO PERMEATE TO TOTAL (RECOVERY RATIO) | | | | IF | < | 0.8 | RATIO |
| PERMEATE FLOW (PF) | 79 | X | | IF | VALUE | .8(PF + CF) | GPM |
| CONCENTRATE FLOW (CF) | 83 | X | | IF | VALUE | .2(PF + CF) | GPM |
| CONCENTRATE VALVE | 81 | | X | THEN | OPEN | 2 | 0-10 SCALE |
| RECIRCULATE VALVE | 77 | | X | THEN | CLOSED | 0 | 0-10 SCALE |
| RECIRCULATE FLOW | 84 | | | | 0 | 0 | GPM |
| ANTI SCALE PUMP | 72 | | X | TEEN | RUNNING | 3 | 0-10 SCALE |
| F5B - TYPICAL 15,000 PPM AND NOMINAL HARDNESS | | | | | | | |
| VALUES TO SYSTEM CONTROLS ITEM #70 | ITEM # | INPUT | OUTPUT | | | Lower Osmonic Pressure and Typical Permeate Flow Typical Hardness and PH ratio to Feed TDS | |
| FEED TDS | 64A | X | | IF | =to | 15000 | TDS |
| CONENTRATE TDS | 82 | X | | IF | < | 61000 | TDS |
| FEED PRESSURE | 75 | X | | IF | < | 800 | PSI |
| FEED PUMP SPEED | 71 | | X | THEN | | 70 | 0-100 SCALE |
| FEED LSI - HARDNESS AND PH | 64C, 78? | X | | IF | < | 1.5 | LSI |
| START IX HARDNESS | 64C | X | | IF | < | 200 | PPM |
| START IX HARDNESS BYPASS VALVE | 86 | | X | THEN | OPEN | 6 | 0-10 SCALE |
| HARDNESS BYPASS FLOW (HBPF) RATIO OF TOTAL FLOW | 88 | X | | THEN | VALUE | .6(PF + CF) | GPM |
| FLOW METERS RATIO PERMEATE TO TOTAL | | | | IF | < | 0.75 | RATIO |
| PERMEATE FLOW (PF) | 79 | X | | IF | VALUE | .75(PF + CF) | GPM |
| CONCENTRATE FLOW (CF) | 83 | X | | IF | VALUE | .25(PF + CF) | GPM |
| CONCENTRATE VALVE | 81 | | X | THEN | OPEN | 3 | 0-10 SCALE |
| RECIRCULATE VALVE | 77 | | X | THEN | CLOSED | 0 | 0-10 SCALE |
| RECIRCULATE FLOW | 84 | | | | 0 | 0 | GPM |
| ANTI SCALE PUMP | 72 | | X | THEN | RUNNING | 3 | 0-10 SCALE |
| F5C - TYPICAL 20,000 PPM AND NOMINAL HARDNESS | | | | | | | |
| VALUES TO SYSTEM CONTROLS ITEM #70 | ITEM # | INPUT | OUTPUT | | | Higher Osmonic Pressure and Typical Permeate Flow Typical Hardness and PH in ratio to Feed TDS | |
| FEED TDS | 64A | X | | IF | =to | 20000 | TDS |
| CONENTRATE TDS | 82 | X | | IF | < | 80000 | TDS |
| FEED PRESSURE | 75 | X | | IF | < | 1000 | PSI |
| FEED PUMP SPEED | 71 | | X | THEN | | 75 | 0-100 SCALE |
| FEED LSI - HARDNESS AND PH | 64C, 78? | X | | IF | < | 1.5 | LSI |
| START IX HARDNESS | 64C | X | | IF | < | 260 | PPM |
| START IX HARDNESS BYPASS VALVE | 86 | | X | THEN | OPEN | 5 | 0-10 SCALE |
| HARDNESS BYPASS FLOW (HBPF) RATIO OF TOTAL FLOW | 88 | X | | THEN | VALUE | .5(PF + CF) | GPM |
| FLOW METERS RATIO PERMEATE TO TOTAL | | | | IF | < | 0.75 | RATIO |
| PERMEATE FLOW (PF) | 79 | X | | IF | VALUE | .75(PF + CF) | GPM |
| CONCENTRATE FLOW (CF) | 83 | X | | IF | VALUE | .25(PF + CF) | GPM |
| CONCENTRATE VALVE | 81 | | X | THEN | OPEN | 2 | 0-10 SCALE |
| RECIRCULATE VALVE | 77 | | X | THEN | CLOSED | 0 | 0-10 SCALE |
| RECIRCULATE FLOW | 84 | | | | 0 | 0 | GPM |
| ANTI SCALE PUMP | 72 | | X | THEN | RUNNING | 4 | 0-10 SCALE |
| F5D - TYPICAL 30,000 PPM AND NOMINAL HARDNESS | | | | | | | |
| VALUES TO SYSTEM CONTROLS ITEM #70 | ITEM # | INPUT | OUTPUT | | | High Osmonic Pressure and lower Permeate Flow Typical Hardness and PH in ratio to Feed TDS | |
| FEED TDS | 64A | X | | IF | =to | 30000 | TDS |
| CONENTRATE TDS | 82 | X | | IF | < | 95000 | TDS |

TABLE 1-continued

| | | INPUT | OUTPUT | | | | |
|---|---|---|---|---|---|---|---|
| FEED PRESSURE | 75 | X | | IF | < | 1200 | PSI |
| FEED PUMP SPEED | 71 | | X | THEN | | 85 | 0-100 SCALE |
| FEED LSI - HARDNESS AND PH | 64C, 78? | X | | IF | < | 2 | LSI |
| START IX HARDNESS | 64C | X | | IF | < | 390 | PPM |
| START IX HARDNESS BYPASS VALVE | 86 | | X | THEN | OPEN | 3 | 0-10 SCALE |
| HARDNESS BYPASS FLOW (HBPF) RATIO OF TOTAL FLOW | 88 | X | | THEN | VALUE | .3(PF + CF) | GPM |
| FLOW METERS RATIO PERMEATE TO TOTAL | | | | IF | < | 0.68 | RATIO |
| PERMEATE FLOW (PF) | 79 | X | | IF | VALUE | .68(PF + CF) | GPM |
| CONCENTRATE FLOW (CF) | 83 | X | | IF | VALUE | .32(PF + CF) | GPM |
| CONCENTRATE VALVE | 81 | | X | THEN | OPEN | 2 | 0-10 SCALE |
| RECIRCULATE VALVE | 77 | | X | THEN | CLOSED | 0 | 0-10 SCALE |
| RECIRCULATE FLOW | 84 | | | | 0 | 0 | GPM |
| ANTI SCALE PUMP | 72 | | X | THEN | RUNNING | 5 | 0-10 SCALE |

TABLE 2

F6A - TYPICAL 12,000 PPM AND HIGH HARDNESS

| VALUES TO SYSTEM CONTROLS ITEM #70 | ITEM # | INPUT | OUTPUT | Lower Osmonic Pressure and more Permeate Flow Higher Hardness and PH in ratio to Feed TDS | | | |
|---|---|---|---|---|---|---|---|
| FEED TDS | 64A | X | | IF | < | 12000 | TDS |
| CONENTRATE TDS | 82 | X | | IF | < | 61000 | TDS |
| FEED PRESSURE | 75 | X | | IF | < | 800 | PSI |
| FEED PUMP SPEED | 71 | | X | THEN | | 65 | 0-100 SCALE |
| FEED LSI - HARDNESS AND PH | 64C, 78? | X | | IF | < | 2 | LSI |
| START IX HARDNESS | 64C | X | | IF | < | 250 | PPM |
| START IX HARDNESS BYPASS VALVE | 86 | | X | THEN | OPEN | 5 | 0-10 SCALE |
| HARDNESS BYPASS FLOW (HBPF) RATIO OF TOTAL FLOW | 88 | X | | THEN | VALUE | .5(PF + CF) | GPM |
| FLOW METERS RATIO PERMEATE TO TOTAL | | | | IF | < | 0.8 | RATIO |
| PERMEATE FLOW (PF) | 79 | X | | IF | VALUE | .8(PF + CF) | GPM |
| CONCENTRATE FLOW (CF) | 83 | X | | IF | VALUE | .2(PF + CF) | GPM |
| CONCENTRATE VALVE | 81 | | X | THEN | OPEN | 2 | 0-10 SCALE |
| RECIRCULATE VALVE | 77 | | X | THEN | CLOSED | 0 | 0-10 SCALE |
| RECIRCULATE FLOW | 84 | | | | 0 | 0 | GPM |
| ANTI SCALE PUMP | 72 | | X | THEN | RUNNING | 4 | 0-10 SCALE |

F6B - TYPICAL 15,000 PPM AND HIGH HARDNESS

| VALUES TO SYSTEM CONTROLS ITEM #70 | ITEM # | INPUT | OUTPUT | Average Osmonic Pressure and tyical Permeate Flow Higher Hardness and PH in ratio to Feed TDS | | | |
|---|---|---|---|---|---|---|---|
| FEED TDS | 64A | X | | IF | =to | 15000 | TDS |
| CONENTRATE TDS | 83 | X | | IF | < | 61000 | TDS |
| FEED PRESSURE | 75 | X | | IF | < | 800 | PSI |
| FEED PUMP SPEED | 71 | | X | THEN | | 70 | 0-100 SCALE |
| FEED LSI - HARDNESS AND PH | 64C, 78? | X | | IF | < | 2 | LSI |
| START IX HARDNESS | 64C | X | | IF | < | 300 | PPM |
| START IX HARDNESS BYPASS VALVE | 86 | | X | THEN | OPEN | 4 | 0-10 SCALE |
| HARDNESS BYPASS FLOW (HBPF) RATIO OF TOTAL FLOW | 88 | X | | THEN | VALUE | .4(PF + CF) | GPM |
| FLOW METERS RATIO PERMEATE TO TOTAL | | | | IF | < | 0.75 | RATIO |
| PERMEATE FLOW (PF) | 79 | X | | IF | VALUE | .75(PF + CF) | GPM |
| CONCENTRATE FLOW (CF) | 83 | X | | IF | VALUE | .25(PF + CF) | GPM |
| CONCENTRATE VALVE | 81 | | X | THEN | OPEN | 3 | 0-10 SCALE |
| RECIRCULATE VALVE | 77 | | X | THEN | CLOSED | 0 | 0-10 SCALE |
| RECIRCULATE FLOW | 84 | | | | 0 | 0 | GPM |
| ANTI SCALE PUMP | 72 | | X | THEN | RUNNING | 4 | 0-10 SCALE |

F6C - TYPICAL 20,000 PPM AND HIGH HARDNESS

| VALUES TO SYSTEM CONTROLS ITEM #70 | ITEM # | INPUT | OUTPUT | Higher Osmonic Pressure and tyical Permeate Flow Higher Hardness and PH in ratio to Feed TDS | | | |
|---|---|---|---|---|---|---|---|
| FEED TDS | 64A | X | | IF | =to | 20000 | TDS |
| CONENTRATE TDS | 82 | X | | IF | < | 80000 | TDS |
| FEED PRESSURE | 75 | X | | IF | < | 1000 | PSI |
| FEED PUMP SPEED | 71 | | X | THEN | | 75 | 0-100 SCALE |
| FEED LSI - HARDNESS AND PH | 64C, 78? | X | | IF | < | 1.5 | LSI |
| START IX HARDNESS | 64C | X | | IF | < | 400 | PPM |
| START IX HARDNESS BYPASS VALVE | 86 | | X | THEN | OPEN | 3 | 0-10 SCALE |
| HARDNESS BYPASS FLOW (HBPF) RATIO OF TOTAL FLOW | 88 | X | | THEN | VALUE | .3(PF + CF) | GPM |
| FLOW METERS RATIO PERMEATE TO TOTAL | | | | IF | < | 0.75 | RATIO |
| PERMEATE FLOW (PF) | 79 | X | | IF | VALUE | .75(PF + CF) | GPM |

TABLE 2-continued

| | | | | | | | |
|---|---|---|---|---|---|---|---|
| CONCENTRATE FLOW (CF) | 83 | X | | IF | VALUE | .25(PF + CF) | GPM |
| CONCENTRATE VALVE | 81 | | X | THEN | OPEN | 2 | 0-10 SCALE |
| RECIRCULATE VALVE | 77 | | X | THEN | CLOSED | 0 | 0-10 SCALE |
| RECIRCULATE FLOW | 84 | | | | 0 | 0 | GPM |
| ANTI SCALE PUMP | 72 | | X | THEN | RUNNING | 5 | 0-10 SCALE |

F6D - TYPICAL 30,000 PPM AND NOMINAL HARDNESS

| VALUES TO SYSTEM CONTROLS ITEM #70 | ITEM # | INPUT | OUTPUT | High Osmonic Pressure and lower Permeate Flow Higher Hardness and PH in ratio to Feed TDS | | | |
|---|---|---|---|---|---|---|---|
| FEED TDS | 64A | X | | IF | =to | 30000 | TDS |
| CONENTRATE TDS | 82 | X | | IF | < | 95000 | TDS |
| FEED PRESSURE | 75 | X | | IF | < | 1200 | PSI |
| FEED PUMP SPEED | 71 | | X | THEN | | 85 | 0-100 SCALE |
| FEED LSI - HARDNESS AND PH | 64C, 78? | X | | IF | < | 2 | LSI |
| START IX HARDNESS | 64C | X | | IF | < | 600 | PPM |
| START IX HARDNESS BYPASS VALVE | 86 | | X | THEN | OPEN | 2 | 0-10 SCALE |
| HARDNESS BYPASS FLOW (HBPF) RATIO OF TOTAL FLOW | 88 | X | | THEN | VALUE | .2(PF + CF) | GPM |
| FLOW METERS RATIO PERMEATE TO TOTAL | | | | IF | < | 0.68 | RATIO |
| PERMEATE FLOW (PF) | 79 | X | | IF | VALUE | .68(PF + CF) | GPM |
| CONCENTRATE FLOW (CF) | 83 | X | | IF | VALUE | .32(PF + CF) | GPM |
| CONCENTRATE VALVE | 81 | | X | THEN | OPEN | 2 | 0-10 SCALE |
| RECIRCULATE VALVE | 77 | | X | THEN | CLOSED | 0 | 0-10 SCALE |
| RECIRCULATE FLOW | 84 | | | | 0 | 0 | GPM |
| ANTI SCALE PUMP | 72 | | X | THEN | RUNNING | 6 | 0-10 SCALE |

The control system provides adjustments to achieve high performance of the RO system with the variation in feed water TDS. As produced water varies in its concentration of metals, salts and other substances, the RO system needs special controls to provide optimum operation and to prevent fouling of the membranes as these substances increase or decrease in concentration. This produced water generated by oil and gas wells will vary in concentration and make-up of materials. This system will see water which comes from varying wells on a random basic. The RO system needs to be pushed to its limits of pressure and concentration of salts and scaling materials in order to optimize the production of clean water, without sacrificing the life of the membranes or running them beyond the pressure limits. Unlike conventional desalinization, reverse osmosis units, this system needs to take into account both feed TDS and feed hardness or scaling materials. The system needs to be able to make independent adjustments to both parameters of the TDS and hardness or scaling materials. The system controls measure hardness (calcium and magnesium), boron, PH, TDS and other materials in the water supplied to the inlet of the RO. The hardness, which can be extremely high in certain produced waters, will only be partially removed by the selective ion exchange system, for cost and efficiency of the operation. The hardness which passes the selective ion exchange process is measured, along with PH and TDS and the total recovery (ratio of pure water to total flow) of the RO system is adjusted as the system runs. The salts, total TDS, other substances and PH play separate but also associated rolls in this control process. Certain materials such as barium, calcium fluoride, silica and other elements which can create scaling, may also be monitored inline and adjustment applied by the control system for these and other materials.

The speed of the drives which operate the RO feed pumps will modulate to maintain the optimum performance of the pressure and flow fed into the RO membranes to provide the best system recovery. The position of the concentrate and recirculation valves are also controlled with motorized valves to work with the pumps speeds to increase or decrease the system recovery rate, which is determined by the concentration of the materials and TDS in the feed water. Flow meters which monitor permeate, concentrate, and recirculation flow rates work with the control system to ensure the balance of proper system operation. Controls of this type are not typical used for an RO system, as the feed water in typical well or desalination applications deal with a relatively consistent water supplies, which operate in a fairly narrow range of variation and do not require such integrated controls, as required for optimum operation of these varying input produced water systems.

The controls will use control parameters from Table 1 and Table 2 which show the inputs to the control system and corresponding outputs to the system devices. The values shown in these charts can represent the variation in fluid which is brought to a system which treats water from multiple well sites, which is commonly required. As the feed TDS of the solution increases, the osmotic pressure on the membrane increase and the system recovery ratio needs decreases. As the system senses this increase in feed TDS, controls will increase the feed pump speed to concentrate TDS limit and a target recovery ration, indicated by the permeate and concentrate flowmeters.

The system also integrates with the selective ion exchange system which is removing certain materials required by the process and the optimum operation of the RO system. It is costly to remove materials that are not required to be removed, so the interface between these systems and their reaction to each other creates value and efficiency. The selective ion exchange removal of the calcium and magnesium is performed to only partially remove these materials, as the RO system can tolerate certain concentration of these materials in relationship to the system recovery ratio, which is primarily targeted on the feed and concentrate TDS. An anti-scale solution is added to the feed water to inhibit the sedimentation of the scaling compounds on the membrane surface, so the control of this pump and the rate of its feed is also controlled. In addition to anti-scale solution, sulfuric acid or other acids may be metered in to the feed water to combat the high PH or scaling potential of the feed water.

Table 2 shows feed water with higher concentrations of hardness to the feed TDS than in Table 1 and the corresponding changes made to the selective ion exchange for hardness and anti-scale added. The system will adjust on the fly to changes in these compound. The ion exchange bypass valve is proportionally closed to lower the ratio of water bypassing the selective ion exchange system and remove a higher percentage of the hardness ions as required. As the TDS and hardness increases it also increases other scaling compounds in the water and adjustments to the recovery rate and anti-scale pump are made to compensate for these additional scaling compounds. If the hardness ions are greater than shown in Table 2, the recovery rates is reduced to prevent scaling problems. This is done by the system controls opening the concentrate valve and increasing the concentrate flow. The feed pump speed at a point will also be reduced to lower the pressure on the membranes and produce less permeate flow, lowing this recovery ratio. If the TDS is high, but the hardness is low, the system will increase the feed pump speed to optimize the permeate production, while keeping the system under the maximum allowable feed pressure on the membranes.

Depending upon the system size and membrane configuration, the system may not require a recirculation loop, with valve and flow meter. At times systems require this or when systems deal with high TDS waters the recirculation is required to maintain proper velocity across the membranes.

The inputs and outputs shown are for illustration and simplicity of this description, although other elements in the water and output devices may be required for specific application. The saturation index shown is made from a calculation of hardness and PH in the control system. In reality, other elements also influence the saturation index and may require addition input devices. This control system can be a conventional PLC, circuit board, PC operated control system or other.

The two stage RO system allows for added pass through of the contaminants in the selective ion exchange stage. This will allow for the selective ion exchange stages to allow greater bleed through of the contaminants, calcium, magnesium, boron etc., which reduces the frequency of regeneration. The selective ion exchange regeneration is the most expensive phase of the system to operate. The contaminants which are allowed to bleed through the resin are captured by the second stage RO and retained in its concentrate stream, which flows back to the inlet of the process. The concentration of these contaminants in this second stage RO concentrate are lower than the concentration of these materials in the incoming produced water and are effectively removed as they flow back through the re-oxygenation in the enhanced oil water separation phase and EC process.

This second stage RO runs at a much lower feed pressure, as the first stage RO removes approximately 97% of the total dissolved solids before the water is fed to the second stage RO. The second stage RO can also run at higher concentration, of 90% or greater, while running at these lower pressures of 300 psi or less. Therefore the operation of the second stage is performed with very little operating cost, provides extremely clean water for reuse and reduces the frequency of the high regeneration costs of the selective ion exchange system, while generating no unused flow streams. The permeate clean water from this process, typically 100 PPM TDS or less, is very clean and suitable for the most stringent agricultural requirements.

A number of embodiments have been described. Nevertheless, it will be understood that various modifications may be made without departing from the spirit and scope of the disclosure.

For example, some applications require softening of fresh water, which is used for various functions. FIG. 5 shows a system substantially similar to the system shown in FIG. 1, with the addition of a free softening system which is regenerated by flow of the RO concentrate 62. The sodium chloride concentration from this flow is clean, filtered and has the metals, silica etc. removed. This water is pumped through particle filter 101 and into the ion exchange tank 102 with a special softening resin 103. Rejected water from the particle filter 101 will flow through pipe 39 to 36 for additional treatment. The softened water flows from this ion exchange tank 102 out 107 when the valve 106 is open and 104 is closed. The flow from 107 is filtered and softened and suitable for boiler feed or other applications. To regenerate the resin 103 the concentrated salt solution in 62 is allowed to flow into the ion exchange tank 102 for regeneration. During this process, valve 106 will close and valves 104 and 105 will open. This resin will go through a typical resin regeneration process and this specialized resin 103 is regenerated by the flow of salt solution from 104 will pass through the resin 103 for regeneration and out valve 105.

Accordingly, other embodiments are within the scope of the following claims.

What is claimed is:

1. A system for treating produced water and/or flowback water from fracking operations, the system comprising:
   an oil water separator with an input connection for receiving the produced water and/or flowback water from fracking operations, the oil water separator comprising:
      a housing with a level control weir plate separating a reservoir in the housing from treatment portions of the oil water separator, the level control weir plate setting a water level in a specific gravity section, a gas flotation system downstream of the specific gravity section, and a coalescing media pack downstream of the gas flotation system, wherein the specific gravity section, the gas flotation system, and the coalescing media pack are disposed in the housing;
      the specific gravity section having an underlying cone section with a sediment discharge connection at the bottom;
      a first baffle plate separating the specific gravity section from the gas flotation system downstream of the specific gravity section, the first baffle plate positioned such that water can flow above and below the first baffle plate from the specific gravity section into the gas flotation system;
      wherein the gas flotation system comprises a source of an oxygenated gas and a distribution element configured to impart the oxygenated gas in the form of microbubbles with a characteristic size of between 5 and 50 microns into the produced water and/or flowback water from fracking operations being treated, and
      a second baffle plate extending across the water level set by the level control weir, the second baffle plate between the coalescing media pack and the level control weir;
   a first filter downstream of the oil water separator; and
   an electrocoagulation unit downstream of the first filter.

2. The system of claim 1, wherein the oxygenated gas comprises air.

3. The system of claim 1, comprising a clarifier downstream of the electrocoagulation unit.

4. The system of claim 3, comprising a reverse osmosis system downstream of the clarifier.

5. The system of claim 4, comprising a second filter downstream of the clarifier and upstream of the reverse osmosis system.

6. The system of claim 4, comprising an ion exchange system downstream of the clarifier and upstream of the reverse osmosis system.

7. The system of claim 3, comprising a solids separation/concentration device disposed to receive solids from the clarifier.

8. The system of claim 7, comprising piping providing a channel between an outlet of the solids separation/concentration device and an inlet of the oil water separator.

9. A method of treating water, the method comprising:
using the oil water separator of the system of claim 1 to separate oil from the water being treated by using differences of specific gravity and then adding the microbubbles to the water being treated to lift material in the water being treated;
applying electrocoagulation to the water being treated after separating the oil from the water being treated;
removing dissolved solids from the water being treated using ion exchange; and then
removing dissolved salts from the water being treated using reverse osmosis.

10. The method of claim 9, wherein adding the microbubbles to the water being treated increases oxygen levels in the water being treated.

11. The method of claim 9, wherein the ion exchange preferentially removes calcium, magnesium, and/or boron.

12. The method of claim 9, wherein applying the electrocoagulation to the water being treated creates oxides of at least some metals present in the water being treated and disassociates hydrocarbons and other organic materials.

13. A method of producing a concentrated brine for use in industrial applications, the method comprising:
introducing the produced water into the oil water separator of the system of claim 1;
increasing oxygen levels in the produced water being treated in the oil water separator by adding the microbubbles to the produced water being treated;
applying electrocoagulation to the produced water discharged from the oil water separator;
concentrating dissolved salts in the produced water being treated using reverse osmosis to produce the concentrated brine; and
collecting the concentrated brine for use in industrial applications.

14. The method of claim 13, comprising removing the dissolved solids from the produced water being treated using ion exchange before concentrating the dissolved salts in the water being treated using reverse osmosis.

15. The method of claim 14, wherein removing the dissolved solids from the produced water being treated using the ion exchange comprises preferentially removing calcium and magnesium by ion exchange and then preferentially removing boron by ion exchange.

16. The method of claim 13, wherein applying the electrocoagulation to the produced water being treated creates oxides of boron present in the produced water being treated and disassociates hydrocarbons and other organic materials.

17. The method of claim 16, wherein applying the electrocoagulation to the produced water being treated creates oxides of metals other than boron present in the produced water being treated.

18. The system of claim 1, wherein the first filter comprises an oleophilic media.

19. The system of claim 1, further comprising an ultrasonic generator operable to generate ultrasonic waves targeted on the water level downstream of the gas flotation system.

20. The system of claim 1, further comprising a pipe positioned to draw oil from a liquid surface downstream of the coalescing media pack and upstream of the second baffle plate.

21. The system of claim 20, further comprising a suction pump operable to transfer the oil to a storage tank.

22. The system of claim 21, further comprising sensors able to sense a difference between water and oil, the sensors connected to a control box sending control signals to the suction pump.

* * * * *